Figure 2:
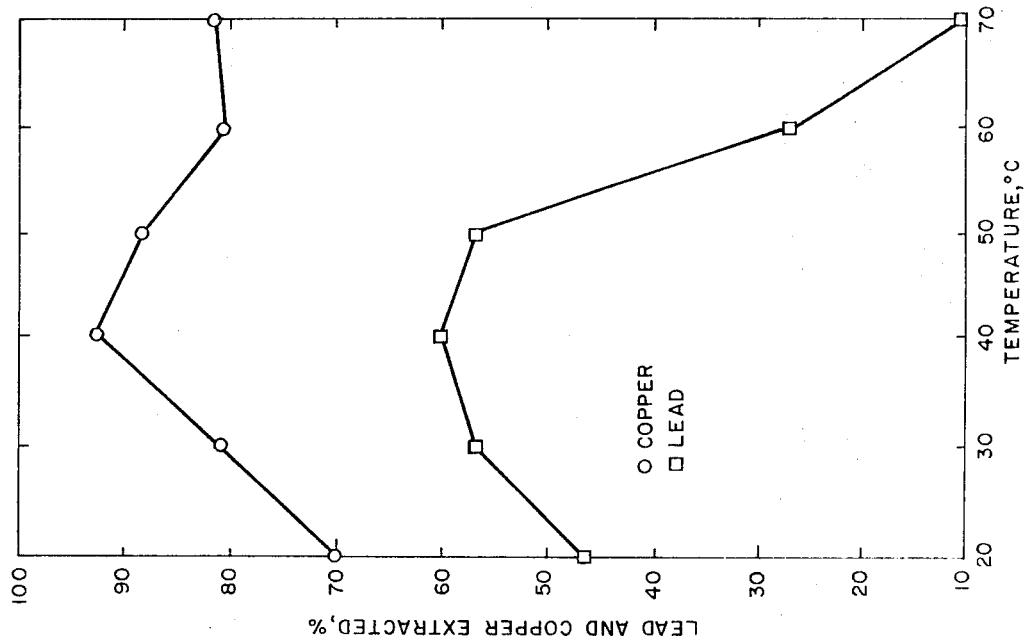

United States Patent

[11] 3,615,190

| [72] | Inventors | John D. Corrick |
| | | Olney; |
| | | Joseph A. Sutton, Rockville, both of Md. |
| [21] | Appl. No. | 794,979 |
| [22] | Filed | Jan. 29, 1969 |
| [45] | Patented | Oct. 26, 1971 |
| [73] | Assignee | The United States of America as represented by the Secretary of the Interior |

[54] OXIDATION OF LEAD BLAST FURNANCE MATTE
2 Claims, 2 Drawing Figs.

| [52] | U.S. Cl. | 23/125, 23/127, 75/120 |
| [51] | Int. Cl. | C22b 13/04, C01g 21/20 |
| [50] | Field of Search | 23/117, 125, 127; 75/101, 115, 120 |

[56] References Cited
UNITED STATES PATENTS

| 1,937,637 | 12/1933 | Christensen | 23/127 X |
| 2,018,438 | 10/1935 | Christensen | 23/127 X |
| 2,950,964 | 8/1960 | Forward et al. | 75/103 |
| 3,241,951 | 3/1966 | Forward et al. | 75/120 |
| 3,316,059 | 4/1967 | Vizsolyi et al. | 23/127 X |

FOREIGN PATENTS

| 1,160,624 | 1/1964 | Germany | 75/101 |

*Primary Examiner*—Oscar R. Vertiz
*Assistant Examiner*—G. O. Peters
*Attorneys*—Ernest S. Cohen and William S. Brown ABSTRACT: A process for oxidizing lead blast furnace matte comprising treating the matte with oxygen in an acidic aqueous solution having a pH not in excess of about 1.5 and a temperature not in excess of about 50° C. This results in oxidation of metallic sulfides, e.g., lead, copper and iron sulfides, in the matte to sulfates which can then be separated by conventional leaching methods. The process thus enables recovery of both lead and copper from the matte.

INVENTORS
**JOHN D. CORRICK
JOSEPH A. SUTTON**

BY *Ernest S. Cohen*
   *William S. Brown*
ATTORNEYS

OXIDATION OF LEAD BLAST FURNANCE MATTE

A large proportion of all lead produced in the United States comes from secondary sources such as lead battery plates. The most commonly used method for recovery of lead from these plates is smelting in a blast furnace. The charge to the blast furnace generally consists of battery plates, limestone, coke, fluorspar and scrap iron or mill scale. Products from the furnace are lead metal, a matte comprising sulfides of lead, copper and iron and a slag that normally contains less than 1 percent lead.

The matte, which is normally a waste material, represents a serious loss of lead. Depending on the accuracy of adjustments in charge composition, mattes will contain from 10 to 20 percent lead and most of the copper that accompanies the charge as copper connector lugs. Larger additions of scrap iron or mill scale will free part of the metal in a high-lead matte but a point will be reached when the cost of such additions is greater than the value of the metal made free. From the standpoint of both economics and conservation it would be desirable to have a suitable process for salvaging the metals in this waste.

It has now been found, according to the process of the invention, that this may be accomplished by oxidation of the matte with oxygen in an acidic aqueous solution having a pH not in excess of about 1.5 and a temperature not in excess of about 50° C. This results in conversion of the sulfides in the matte to sulfates according to the following equation:

$$PbS + CuS + FeS + 4O_2 + H_2SO_4 \rightarrow PbSO_4 + CuSO_4 + FeSO_4 + H_2S.$$

The resulting sulfates are then readily separated and recovered by conventional extraction techniques.

Lead blast furnace matte, employed as the starting material in the process of the invention, will usually contain about 10 to 20 percent lead, about 1 to 2 percent copper and 20 to 40 percent iron, substantially all of which is in the form of sulfides. The balance of the matte will usually consist essentially of zinc, antimony and alkali metals. The matte is initially ground by conventional means, e.g., in a porcelain ball mill, to a particle size of about minus 200 mesh. Generally, a small particle size gives a more rapid reaction in the process of the invention, a mesh size of about minus 325 usually being optimum for lead recovery and about minus 270, plus 325 optimum for copper recovery.

The ground matte is then reacted in an acidic aqueous medium under conditions that assure good aeration of the liquid phase in order to provide oxygen essential for the reaction. Suitable aeration may be achieved by any conventional means such as shaking, stirring or percolating. The resulting concentration of oxygen in the aqueous medium should be at or near saturation for the solution temperature being used, preferably about 6.6 mg. oxygen per liter of solution at 40° C.

The acidic aqueous medium consists essentially of an aqueous solution of a mineral acid such as sulfuric, hydrochloric or nitric acid. Sulfuric acid is generally preferred since it enables a clean separation of soluble copper sulfate from the insoluble lead sulfate. The concentration of the acid in the aqueous solution should be sufficient to result in a pH value not in excess of about 1.5. Proper adjustment of the pH to such a value is essential to efficient recovery of lead and copper, as is demonstrated in the examples below. A pH range of about 0.25 to 1.5 gives good recovery of both lead and copper, with a pH value of about 0.5 generally being optimum.

Since the liquid, i.e., the aqueous solution, serves as a reservoir for both oxygen and hydrogen ions, it should be present in an amount sufficient to supply suitable amounts of these two essential reactants. The quantity of lead sulfide oxidized has been found to increase gradually with the volume of liquid used, while the quantity of copper sulfide oxidized generally reaches a plateau at a liquid-to-solid ratio of about 20 to 1 (20 ml. liquid per gram of solid). Accordingly, a liquid-to-solid ratio in the range of about 20 to 1 to 45 to 1 is preferred, with a ratio of about 30 to 1 generally being optimum.

The temperature employed in the oxidation reaction has also been found to be important for maximum recovery of both lead and copper. It has been found that temperatures above about 50° C. are detrimental to the oxidation reaction and, hence, result in lower recovery of the metals. This result is also demonstrated in the examples below. Accordingly, a temperature of about 30 to 50° C. is preferred, with about 40° C. usually being optimum.

Optimum time for the oxidation reaction will vary considerably depending on the composition of the matte, desired percentage recovery of lead and copper, type of acid employed, temperature, etc., and is best determined experimentally. A period of about 4 to 15 days, preferably about 15 days, is, however, usually sufficient to obtain the desired results.

Following oxidation of the sulfides to sulfates, the copper and lead are recovered by conventional hydrometallurgical processes. The soluble copper sulfate is separated from the insoluble lead sulfate by conventional means such as filtration or centrifugation. Water-washing of the insoluble residue will usually be desirable for more complete removal of the soluble copper sulfate. Copper is then recovered from the solution by conventional means such as cementation with iron powder or electrolysis.

Lead is readily recovered from the water-insoluble residue by treatment with a brine solution containing sodium and calcium chlorides to dissolve the lead as lead chloride, while the associated sulfate ion is rendered insoluble by formation of calcium sulfate. Treatment with the brine solution preferably involves digestion at elevated temperatures. Washing of the residue with additional hot brine solution and distilled water is usually desirable for more complete recovery of lead. It has also been found that a still more complete recovery of lead may be accomplished by washing the copper-free residue, following the washing with the hot brine solution, with water adjusted to a pH of about 2 with hydrochloric acid. This procedure has been found to give recoveries of lead as much as 31 percent greater than when the washing is done with distilled water. Lead is then recovered from the resulting solution by conventional means such as precipitation of the lead as a basic chloride by the addition of lime.

Recovery of iron may also be accomplished by conventional means such as smelting the residue to pig iron.

The following examples will serve to more particularly illustrate the process of the invention.

EXAMPLES 1-6

These examples illustrate the significance of pH in extraction of lead and copper by the process of the invention. A series of tests were performed in which the pH was varied from 0.25 to 2.5 by varying the concentration of sulfuric acid. Each test was conducted on a lead blast furnace matte containing 17.5 percent lead, 1.83 percent copper and 42.5 percent iron. The matte was initially ground to a particle size of minus 200 mesh. 30 ml. of distilled water adjusted to the desired pH value with sulfuric acid was then added to the ground matte in an Erlenmeyer flask. The mixture was then agitated by a rotary shaker oscillating at 172 r.p.m. at room temperature for a period of 7 days. The oxidized slurry was then filtered and the residue, retained on a Whatman No. 5 filter paper, was washed with distilled water until the wash water remained colorless when tested with ammonium hydroxide. The filtrate and wash water were then combined and analyzed for copper by the cuprethol method.

The residue and filter paper were transferred to a 150 ml. beaker containing 15 ml. of a brine solution (300 g.NaCl+19 g.$CaCl_2 \cdot 2H_2O$ per liter of distilled water) and digested for a period of 2 hours at a controlled temperature of 90° C. The hot residue was then filtered and the residue washed with 5 ml. of hot brine solution and with small quantities of distilled water until lead ion could no longer be detected in the filtrate by addition of 5 drops of 6 M acetic acid and 2 ml. of 0.5 M potassium chromate. The filtrate and wash solution were then combined and analyzed for lead on a Sargent model XV polarograph using an ammonium acetate-acetic acid buffer giving a final 2 M concentration and 0.01 percent gelatin.

Figure 1:
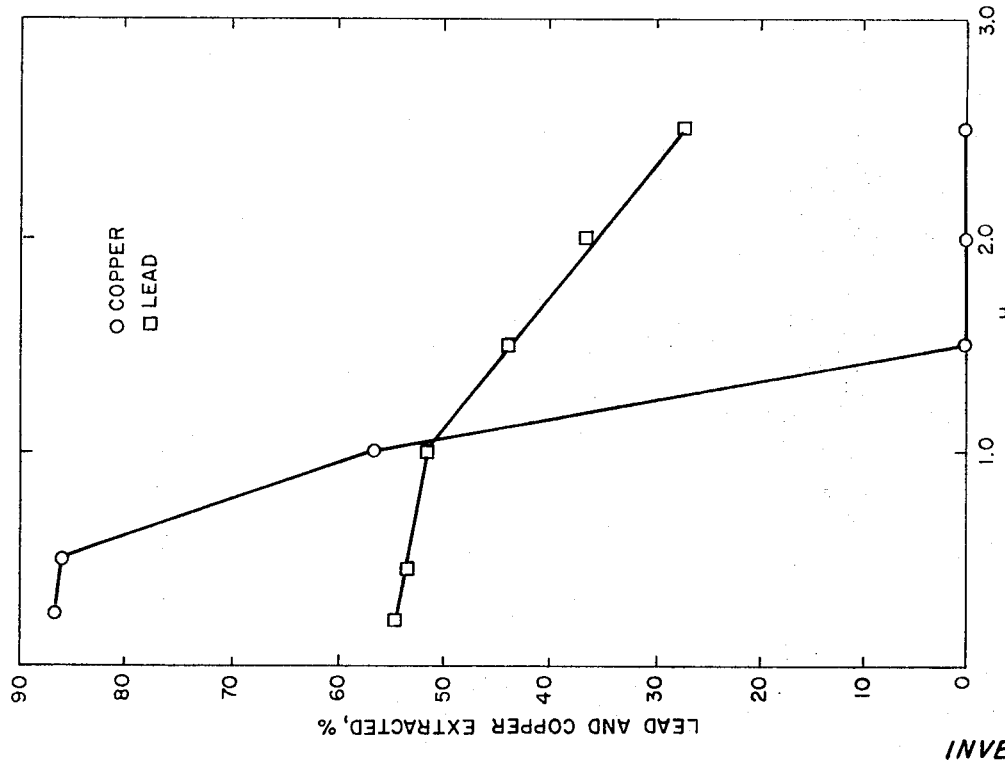

Results are shown in FIG. 1 in which the pH of the solution is plotted against the percent of lead and copper extracted. It will be seen that as the pH increases the quantity of lead and copper extracted decreases until at a pH of 1.5 or greater the extraction of copper was nil.

EXAMPLES 7–12

These examples illustrate the significance of temperature in extraction of lead and copper by the process of the invention. The procedure was essentially the same as that employed in examples 1–6 except that the pH was maintained at 0.5 and the oxidation temperature was varied between 20 to 70° C.

Results are shown in FIG. 2 in which the temperature is plotted against the percent of lead and copper extracted. It will be seen that the maximum quantity of lead and copper was extracted at 40° C. and that extraction was substantially less at temperatures below about 30° C. and above about 50° C. In particular, the quantity of lead extracted was greatly reduced at temperatures above 50° C.

What is claimed is:

1. A process for oxidizing lead and copper sulfides in lead blast furnace matte, containing about 10 to 20 percent lead, 1 to 2 percent copper and 20 to 40 percent iron, to the corresponding sulfates comprising
   1. forming an aqueous sulfuric acid slurry of the matte, the concentration of acid in the slurry being sufficient to provide a pH of about 0.25 to 1.5 and the liquid-to-solid ratio of the slurry being from about 20 to 1 to about 45 to 1 and
   2. aerating said slurry by agitation of the slurry at atmospheric pressure and a temperature of about 30 to 50° C. for a period of about 4 to 15 days.
2. The process of claim 1 which additionally includes the steps of:
   3. separation of the resulting solution of copper sulfate from the insoluble residue containing the lead sulfate,
   4. recovering the lead from the insoluble residue by treatment with a brine solution to convert the insoluble lead sulfate to soluble lead chloride and
   5. subsequently washing the residue sequentially with hot brine solution and with aqueous hydrochloric acid solution having a pH of about 2 to increase the recovery of lead.

* * * * *